Nov. 26, 1935. H. R. BUTLER 2,022,186
TRACTOR TRAILER SYSTEM
Filed Nov. 28, 1932 3 Sheets-Sheet 2
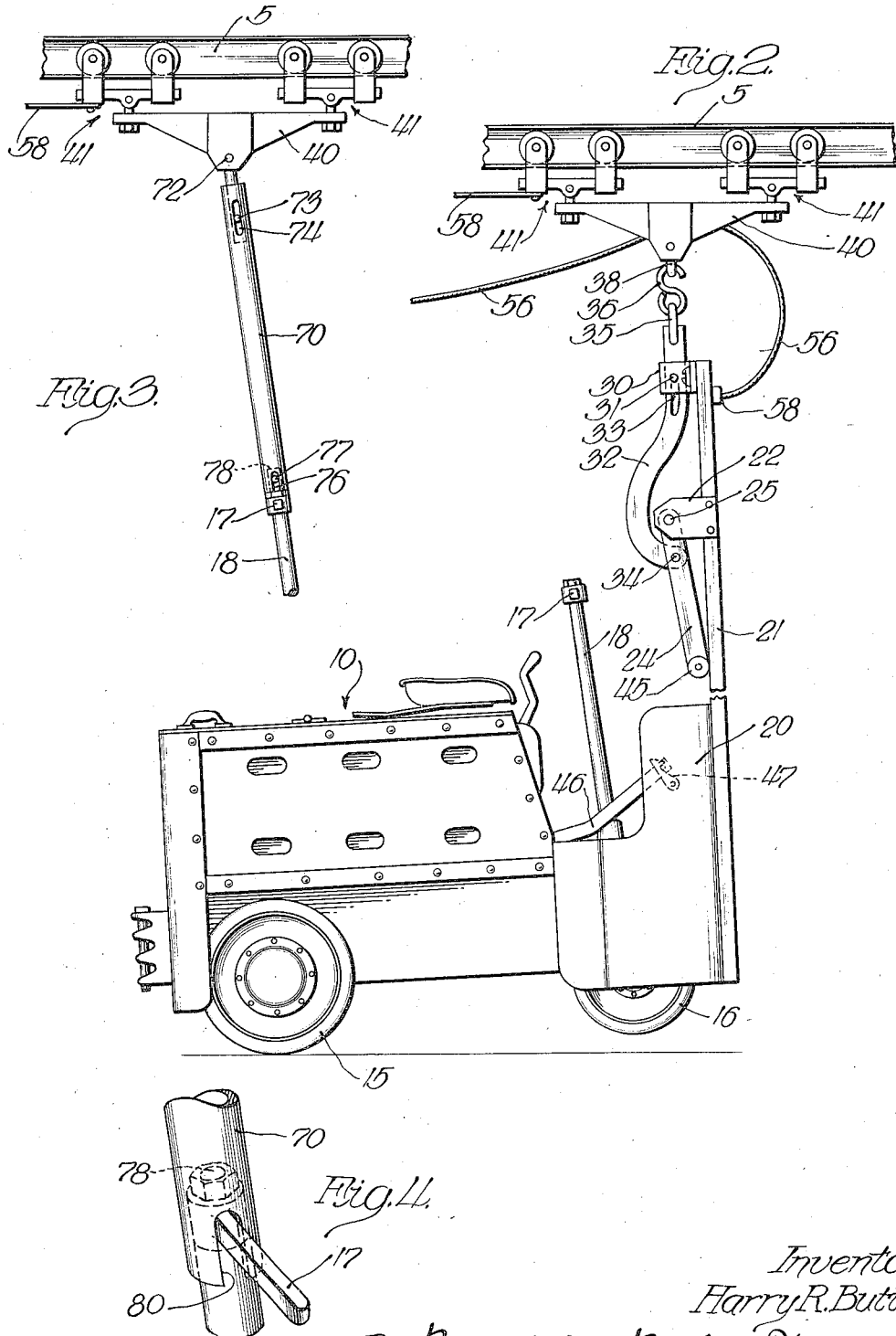
Inventor:
Harry R. Butler
By Brown, Jackson, Boettcher & Dienner
Att'ys.

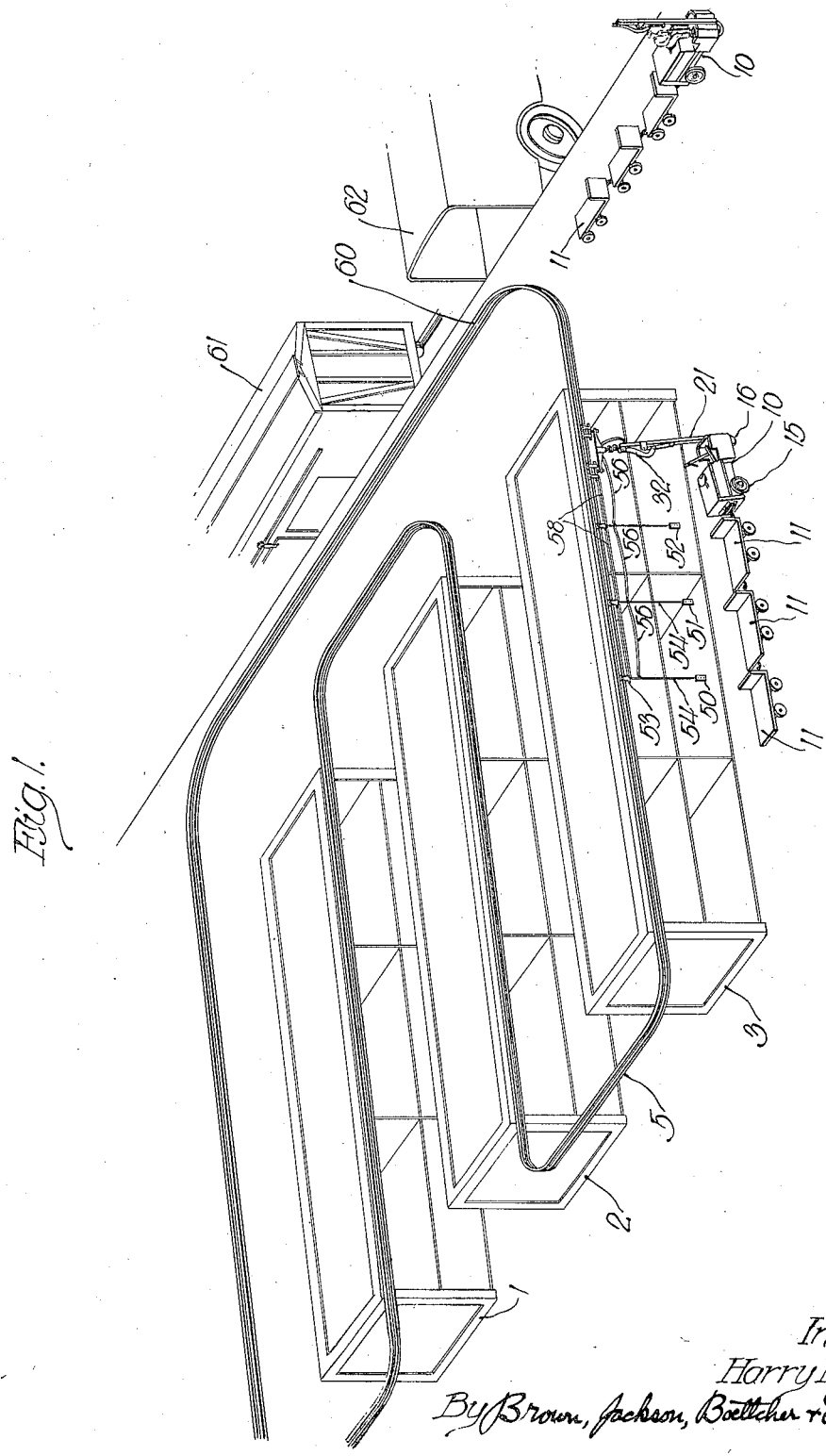

Nov. 26, 1935. H. R. BUTLER 2,022,186
TRACTOR TRAILER SYSTEM
Filed Nov. 28, 1932 3 Sheets-Sheet 3
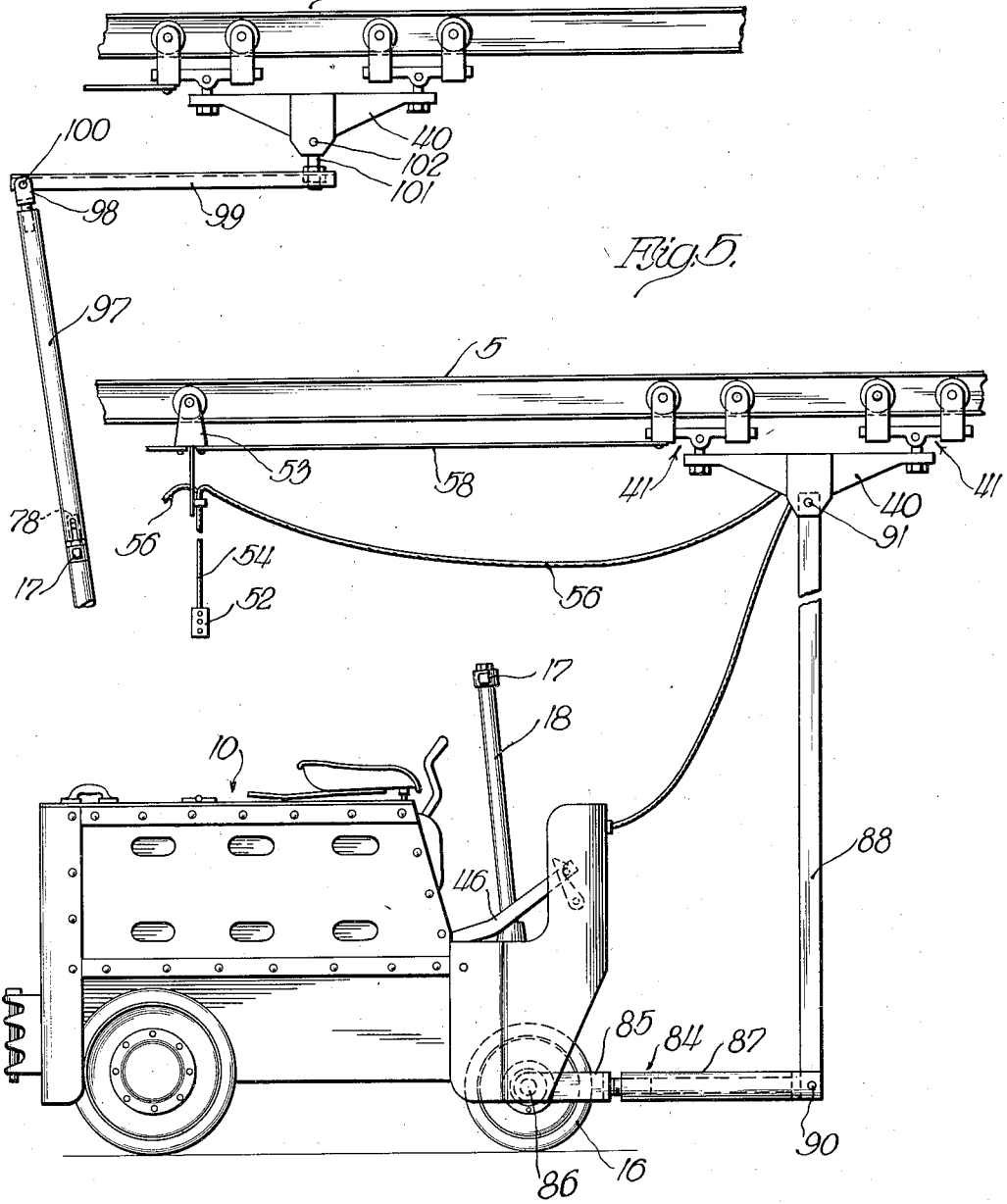

Patented Nov. 26, 1935

2,022,186

UNITED STATES PATENT OFFICE 2,022,186

TRACTOR-TRAILER SYSTEM

Harry R. Butler, New York, N. Y., assignor to Richards-Wilcox Manufacturing Company, Aurora, Ill., a corporation of Illinois Application November 28, 1932, Serial No. 644,652

8 Claims. (Cl. 104—171)

The present invention relates generally to industrial trucks, tractors, tractor-trailer systems, and other combinations utilized in the transportation of merchandise and other articles around warehouses, storerooms, industrial plants and the like.

In the handling of materials and merchandise in manufacturing plants, warehouses, and storage establishments it is well recognized that the smaller the number of times it is necessary to handle any given article or unit the smaller will be the cost of handling or storing or transporting such article or unit. For example, in some warehouses handling a variety of merchandise, it is required that the merchandise shall be stacked or otherwise arranged in a given order and that this order is observed whenever it is necessary to select certain articles of the merchandise to meet requests therefor, as from retail units or other outlets.

With these factors in mind, the present invention contemplates the provision of a tractor-trailer system and associated means for transporting the merchandise, both during the process of collecting the same and during the subsequent process of delivering the same to some point, usually more or less removed from the storage or warehouse units. Briefly, the present invention contemplates the employment of a truck or tractor, either with or without trailers propelled thereby, which is normally capable of being steered but which is, during its course of travel in and around the storage zones, automatically guided in a given path of movement whereby all of the attention of the attendant can be given to the selecting and placing of the merchandise on the truck or trailer, starting and stopping of the truck being effected by remote control means of more or less conventional construction.

With respect to the automatic guiding means for the truck or tractor, the present invention contemplates the provision of means which effectively steers the truck or train along the desired path of movement but which does not at the same time impose undue stresses on any portion of the structure of the building. Specifically, the present invention contemplates employing a floor supported self-contained dirigible tractor, either with or without trailers, which is automatically steered by overhead track means, the latter being subjected only to those loads incident to the steering function and which is not called upon to support the weight of the merchandise itself or any major portion thereof, such being carried upon the normally dirigible tractor-trailer system.

In this connection it is the further object of the present invention to provide detachable steering means for controlling the path of movement of the tractor during at least a portion of its course, but when detached is adapted to restore the normal manual control of the tractor so that the latter, together with any loaded trailers associated therewith, can be moved under its own power and without any restrictions as to direction and/or distance.

Another object of the present invention is the provision of means in a tractor-trailer system for supporting one end of the tractor with its steering wheels out of contact with the supporting surface but with its driving wheels in contact with the supporting surface, the means for so supporting the tractor thereupon serving as supporting the tractor thereupon serving as means for establishing a fixed or predetermined path of movement for the tractor, the latter moving along said path under its own power and controlled, if desired, by remote control means so that the attendant need not go near the tractor itself during the course of its travels along said fixed path.

These and other objects of the present invention will be apparent to those skilled in the art after a consideration of the following detailed description of the preferred embodiment of the invention, illustrated in the accompanying drawings.

In the drawings:

Figure 1 is a perspective view illustrating the application of the principles of the present invention to a tractor-trailer system for warehouses and the like;

Figure 2 is a side elevation of a truck or tractor provided with means placing the same under the steering control of an elevated rail or track;

Figure 3 illustrates a modification in which the dirigible or steering wheels of the tractor remain on the floor but which are placed under the steering or guiding control of the elevated track;

Figure 4 is a modified form of connecting means between the track supported trolley and the steering column of the tractor;

Figure 5 is another modified form of steering control for a truck or tractor; and Figure 6 is a further modification, constructed somewhat along the lines of the form shown in Figure 3, but showing a tongue steered truck.

Referring now to the drawings, particularly to Figure 1, the reference numerals 1, 2, and 3 represent storage spaces or zones in a warehouse or the equivalent, such zones being defined by bins or racks or the equivalent and are adapted to store various articles of merchandise arranged in a given order. The storage racks are separated by aisles, both at the ends and between the racks, as is usual in warehouses and the like.

Supported from the ceiling or in any other manner so as to be suspended above the aisles between the racks 1, 2, and 3, is an overhead track or rail 5 passing down the aisles and around the ends of the racks, and preferably the overhead rail or track 5 defines a fixed circuit or path in and about the storage zones. If desired the track 5 may be formed as a closed circuit, that is, the track may be connected together at its ends. The track 5 may be supported from the ceiling by any of the usual form of supporting means, the details per se of which do not form any part of the present invention, the important feature being that the track 5 defines a fixed or predetermined path of travel which follows the predetermined order in which the merchandise is stored in the racks 1, 2, and 3.

The tractor-trailer train employed for transporting merchandise to and from the storage racks or zones, according to the principles of the present invention, usually comprises a floor supported dirigible truck or tractor 10 and a plurality of trailers 11 upon which the merchandise may be placed. In illustrating the present invention I have shown a tractor-trailer train comprising a truck or tractor and three trailers but it is to be understood that a greater or less number of trailers may be used when desired. Generally, the tractor-trailer train is operated progressively along the racks in and out of the aisles in the order in which the merchandise is stored, and this is true whether the tractor-trailer train is being utilized in bringing merchandise to the storage zones or whether the train is being utilized in picking up merchandise from the storage zone for transport to some other point in the warehouse or outside the same.

In order to secure an automatic steering of the train during the periods in which it is being operated close to the adjacent storage zones, both in delivering merchandise thereto and in picking up merchandise therefrom, the present invention contemplates a novel form of connecting means between the power unit which propels the train and the overhead track which defines a path of movement or course of travel in and about the storage zones in the order in which the merchandise is stored therein.

Referring now more particularly to Figure 2 wherein is illustrated, on a somewhat enlarged scale the power unit 10 in the form of an electrically driven truck or tractor and the associated connecting means placing the tractor under the steering control of the overhead track. The tractor 10 is provided with driving wheels 15, which may be driven either by electric power or by a gasoline motor or any other suitable source of power capable of being placed under the control of a distant operator. The tractor 10 is also provided with dirigible wheel means 16 which is normally adapted to rest on the floor and to be manually controlled by a steering lever 17 supported for movement in a steering column 18 and connected to steer the wheel means 16.

At the front of the tractor 10 there is a bumper plate 20 which affords a convenient support for a standard 21 which is adapted to be secured thereto in any manner desired. The standard 21 extends upwardly to a point adjacent the track 5 and at its upper end is provided with a pair of plates 22 between which is pivotally supported a hand lever 24, as by a pivot pin 25. The upper end of the standard 21 is also provided with a clip or bracket 30 which is provided with a pin 31. A link 32 is slidably supported by the bracket 30 ad is provided with a slot 33 to cooperate with the pin 31 in the bracket 30. The lower end of the lever 32 is pivotally connected with the hand lever 24 by means of a pin or bolt 34. The upper end of the link 32 carries a ring 35 which is provided with a hook 36 detachably connected with an eye 38 secured to a carrier 40 supported by trolleys 41 from the overhead track or rail 5.

It will be observed that the lever 24 and the link 32 are so arranged as to act as a toggle when the lever 24 is in its lower position, for holding and locking the front end of the truck 10 in elevated position. The lever 24 is adapted to be raised and lowered by manual operation, and to facilitate this the lever 24 is provided with a handle 45. In order to pass over the pivots 25 the link 32 is curved, as clearly shown in Figure 2. In order to establish the toggle lock just referred to, the parts are so arranged that a line drawn through the pivots 34 and 25 will lie, when extended upwardly, slightly to the left of the point 31, by virtue of which construction the weight of the front end of the truck will cause the hand lever 24 to lie against the standard 21. It is to be understood, however, that the major portion of the weight of the truck is carried upon the driving wheels which are always in contact with the floor or other supporting surface.

Where the truck 10 is of the type having a brake pedal 46 which automatically applies the brakes of the truck whenever the operator raises the pedal or steps off the machine, latch means 47 may be provided for holding down the pedal 46 to release the brakes.

It is desirable to be able to control the tractor-trailer train from several points remote from the tractor 10 itself, and to this end the present invention contemplates the employment of a remote control system which is constructed along conventional lines. Such remote control includes a plurality of push button units 50, 51, and 52 (see Figure 1) suspended from trolleys 53 by means of cables 54, which may also form a part of the several control circuits. The several control units are suitably connected together by conductors 56 which lead to a removable plug 58 adapted to be received within a suitable socket (not shown) carried by the standard 21 and operatively connected to control the power unit on the tractor 10. Since the present invention is not primarily concerned with the particular details of the control mechanism as such, the control means has been indicated more or less diagrammatically in the drawings. It will be noted, however, that the tractor-trailer train can be started, stopped, accelerated and decelerated from any one of the push button units 50, 51, or 52. Where more than three trailers are employed it is, of course, desirable to extend the control system correspondingly. The trolleys 53 which support the individual push button or units are connected to move together along the track 5 by means of links 58, as best shown in Figures 2 and 5.

The operation of the embodiment described above is substantially as follows. Assuming that the tractor-trailer train has been connected with the guiding rail means 5, as shown in Figures 1 and 2, and assuming that the attendant is ready to start collecting the merchandise in accordance with orders for the same, the attendant assumes control of the tractor-trailer train by operating any one of the push button units 50, 51 or 52, according to where the attendant happens to be with respect to the train. The attendant then operates the train, starting and stopping the same in accordance with the demands for the merchandise and the particular location thereof in the storage zones. The overhead rail system effectively guides the train in and out among the various storage racks or zones and so relieves the attendant of the operation of steering the train, all of his attention being given to picking up the desired merchandise and depositing it on the trailers. After the given circuit defined by the rail means 5 has been traversed and the attendant is ready to deliver the merchandise thus collected, all the attendant has to do is to first lower the front end of the truck 10 swinging upwardly on the hand lever 24, thus breaking the toggle and allowing the steering wheel 16 to again rest on the floor, and then the hook 36 can be disengaged from the truck eye 38, thereby entirely disconnecting the truck 10 from the guiding rail means 5. The remote control means will be disconnected by removing the plug 58 from its socket.

This operation thereupon places the tractor-trailer under the manual control of the attendant, thereby permitting him to mount the tractor and manually steer the same by the steering lever 17 to any point in the plant or warehouse or any other place to which it may be desired to deliver the merchandise collected during the portion of its travels in and among the storage zones and during which time the train was under the automatic guiding or steering control of the overhead track. This relation is illustrated in Figure 1 in which one of the tractor-trailer trains is illustrated as being connected with the track 5 to be automatically steered thereby while the other train illustrated has been disconnected from the track, as described above, and is therefore adapted to be moved under its own power and in any direction. Merely by way of illustration, it may be mentioned that after the merchandise has been collected it may be desirable to deliver the same to some point, such as a loading platform 60 so that the goods may be delivered into a freight car 61 or a motor truck 62, or it may be desired to deliver the goods to a remote point, such as another building.

Conversely, the system described above is equally applicable in removing goods from either a freight car or a motor truck and transporting the same to the storage zones 1, 2, and 3 in order that the merchandise may be placed in the storage racks. In this situation, it is equally desirable to have the tractor-trailer train under the automatic control during the portion of its travels when the train will be guided in and among the storage zones in a fixed and definite path so that the merchandise may be stored in the desired order, and it is desirable to be able to operate the tractor-trailer train under the manual control of the operator in moving from the freight car, motor truck, or other source of supply to the storage zones. The present invention is, of course, of importance in this situation where, as soon as the attendant operating the train reaches the storage zone all it is necessary to do is to engage the hook 36 in an adjacent trolley 40, operate the handle 24 to raise the dirigible wheels from the floor, and insert the control plug 58. When this is done the attendant is then released from any duty of steering the train and then devotes his entire attention to the matter of unloading the goods or merchandise from the trailers. Thus, by the present invention one attendant can perform the same amount of work which formerly required two attendants.

In the modification described above, in order to place the truck under the automatic steering control of the overhead track means, the front end of the truck was raised off the floor so as to raise the dirigible wheels of the truck out of contact therewith. The present invention also contemplates permitting both the driving and the steering wheels to remain in contact with the floor but providing means for placing the truck under the automatic dirigible wheels of the truck under the automatic steering control of the overhead guiding means.

Figure 3 illustrates one means for carrying this into effect. A pipe or sleeve 70 is supported from the carrier 40 by means of a shank 71 pivoted, as at 72, to the carrier 40 and provided with the pin 73 slidably disposed within slots 74 formed in the upper end of the sleeve 70. The lower end of the pipe or sleeve 70 is also slotted, as at 76, to receive a pin 77 carried in the upper end 78 of the steering shaft of the tractor or truck 10. By virtue of the upper and lower slotted connections, the truck 10 may be driven under the carrier 40 and the sleeve 70 raised with respect to the shank 71 an amount sufficient to allow the lower end thereof to drop over the pin 77, from which time the steering shaft 78 is then under the guiding control of the trolley carrier 40 since the pin and slot connections just mentioned, while providing for relative vertical displacement of the sleeve 70, prevent any rotation of the sleeve with respect to either the steering shaft 78 or the trolley shank 71 so that, in this construction, the steering wheel 16, controlled by the steering shaft 78, will be constrained to follow the path of movement defined by the overhead track 5.

In Figure 4 I have illustrated a slightly modified form of connecting means for the lower end of the sleeve 70. In this form the sleeve 70 is provided with a slot 80 which is adapted to engage over the steering handle 17 so that rotation of the sleeve 70, occasioned by the trolley carrier 40 passing around a curve in the track 5, will cause a corresponding rotation of the steering shaft 78, thereby causing the truck 10, as well as any trailers connected therewith, to follow the fixed path defined by the overhead track means 5. The pin and slot construction 73—74, shown in Figure 3, in addition to providing for the elevation of the sleeve 70 so as to conveniently release the steering shaft 78 from the sleeve 70, also provides for a limited amount of vertical displacement of the sleeve 70, and hence also of the truck 10, relative to the track 5 to take care of any inequalities in the floor or ground surface traversed by the truck.

Figure 5 illustrates a construction in which the truck 10 is provided with a tongue 84 comprising a forked casting 85 or the equivalent operatively connected with the axle 86 of the steering wheel 16 so as to turn the same about its steering axis. The tongue 84 also includes a tubular or pipe member 87 which is operatively connected with the casting 85 at its inner end and is slotted at its outer end to receive a vertically disposed bar 88 pivotally connected therewith as by a pin 90. The upper end of the bar 88 is pivotally connected with the trolley carrier 40 by means of a pin 91. As the trolley 40 follows the route established by the overhead track system 5, the bar 88 and the tongue 87 serve to cause the steering wheel 16 of the truck 10 to follow the same path whereby the entire tractor-trailer train is automatically guided by the overhead track means. The pivotal connection of the tongue 84 with the bar 88 and with the steering axle 86 provides for vertical displacement of the truck or tractor 10 with respect to the overhead track 5. When it is desired to disconnect the tractor 10 from the automatic guiding means illustrated in Figure 5, all that it is necessary to do is to remove the pin 90 and secure the tongue 84 in a position so that it will not contact with the floor.

In Figure 6 I have illustrated another form in which the steering shaft 78 is provided at its upper end with a pin, similar to the pin 77 shown in Figure 3, whereby to receive the lower end of a sleeve member 97 which may be similar to the sleeve member 70 shown in Figure 3. The upper end of the sleeve or pipe 97 has fixed thereto a yoke 98 with which the rear end of a steering lever 99 is pivotally connected, as at 100. The forward end of the lever 99 is pivotally connected with a bolt 101 swiveled, as at 102, to the trolley carrier 49. As in the modification shown in Figure 2, rotation of the sleeve or pipe member 97 causes a corresponding rotation of the steering shaft 78 whereby the steering wheel means 16 of the truck 10 is guided. In the modification shown in Figure 6 the trolley is disposed in advance of the sleeve member 97 so that as it follows the route fixed by the overhead rail means the steering wheel means of the truck is constrained to follow substantially the same path. In this form, it is a simple matter to disconnect the truck from the guiding means, this being done by merely raising the sleeve member 97 so as to lift the lower end thereof clear of the pin in the upper end of the steering shaft 78.

While I have described in detail above the preferred forms in which the invention is preferably embodied, it will be apparent to those skilled in the art that my invention is not to be limited to the specific details shown and described above but that, in fact, widely different means may be employed in the practice of the broader aspects of my invention.

What I claim, therefore, and desire to secure by Letters Patent is:

1. A power operated unit including a normally dirigible floor supported truck having driving wheels and steering wheels, and means for optionally supporting the truck with its steering wheels out of contact with the floor, said last named means including elevated rail means operative to guide the truck to automatically follow a given path of movement throughout at least a part of its route.

2. In a train of interconnected vehicles, a tractor having driving and steering wheels, one or more trailers propelled thereby, means including a stationary elevated rail for supporting the tractor with its steering wheels out of contact with the supporting surface, and means releasable from the tractor and cooperating with said rail when said steering wheels are supported out of contact with said supporting surface for automatically guiding said tractor to cause it to traverse a predetermined path of movement.

3. In a tractor-trailer system, a self-contained dirigible power unit, an overhead track defining a predetermined path of movement therefor, a trolley movable along said track, a standard rigidly connected with and held against angular movement with respect to said power unit, and means connecting the upper end of said standard with said trolley for supporting a portion of the weight of and automatically guiding said power unit along said predetermined path.

4. In a tractor-trailer system, a self-contained dirigible power unit including driving wheels and steering wheels, a stationary overhead track defining a predetermined path of movement for the power unit, a trolley movable along said track, a standard rigidly connected with and held against angular movement with respect to said power unit, and releasable means connecting the upper end of said standard with said trolley and adapted when connected to support a portion of the weight of said power unit from said track to raise the steering wheels out of contact with the supporting surface, whereby said track serves to automatically guide the power unit along the predetermined path of movement defined by said track.

5. In a tractor-trailer system, a self-contained dirigible power unit including driving wheel and steering wheel means, an overhead track defining a predetermined path of movement therefor, a trolley member movable along said track, a rigid member secured to said power unit and held against relative angular movement with respect thereto, and means carried by one of said members and adapted to be releasably connected with the other member for supporting said power unit with its steering wheel means out of contact with the supporting surface for guiding the truck so as to cause the truck to follow said predetermined path of movement.

6. A self-propelled power operated unit including a normally dirigible floor supported truck having supporting wheel means and manually controllable steering wheel means, means for rendering said manually controlled steering wheel means ineffective to steer said truck, and stationary means cooperating therewith for guiding the truck to cause the same to automatically follow a given path of movement throughout at least a part of its route.

7. A self-propelled power operated unit including a normally dirigible floor supported truck having supporting wheel means and normally controllable steering wheel means, means for lifting the latter out of contact with the floor and thereby rendering said manually controllable steering wheel means ineffective, and stationary means cooperating therewith for guiding the truck to cause the same to automatically follow a given path of movement throughout at least a part of its route.

8. A self-propelled power operated unit including a normally dirigible floor supported truck having supporting wheel means and manually controllable steering wheel means, means for lifting the latter out of contact with the floor, thereby rendering said manually controllable steering wheel means ineffective, and supporting a portion of the weight of the truck, and stationary means cooperating therewith for carrying the weight of said portion of the truck and acting also to guide the truck to cause the same to automatically follow a given path of movement throughout at least a part of its route.

HARRY R. BUTLER.